Figure 5:
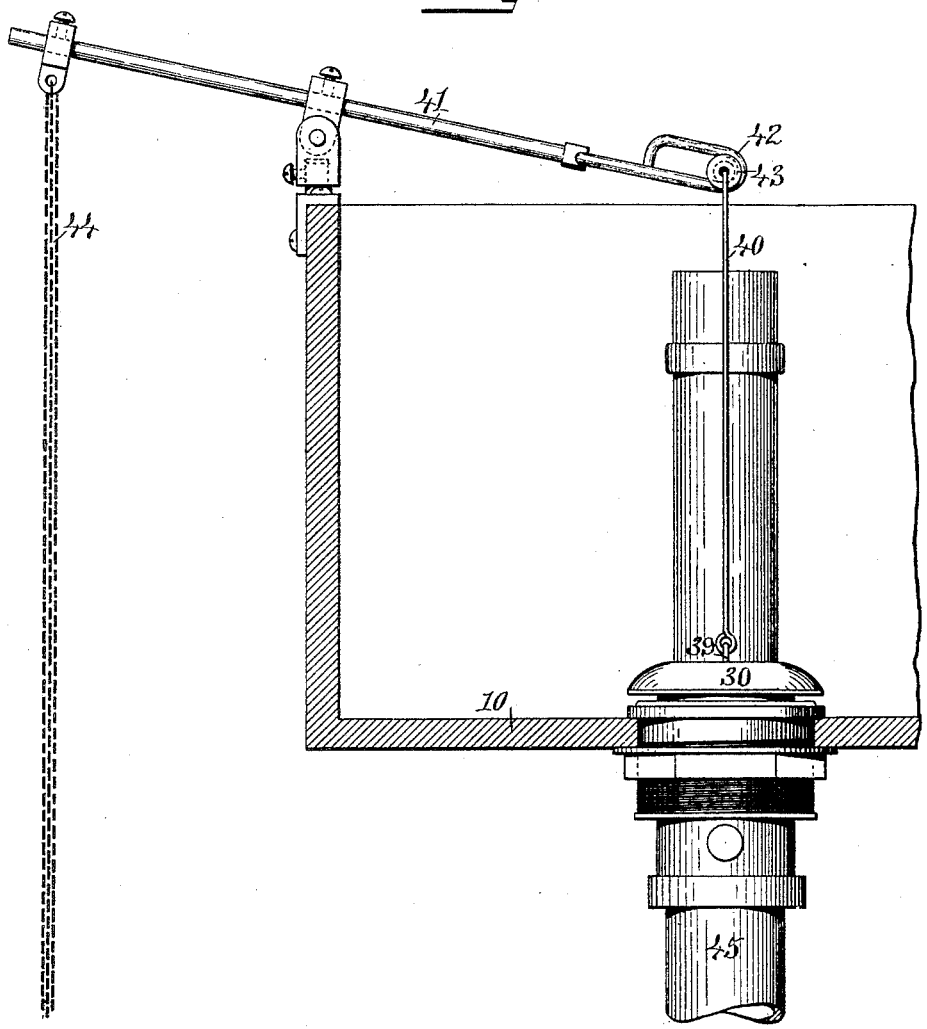

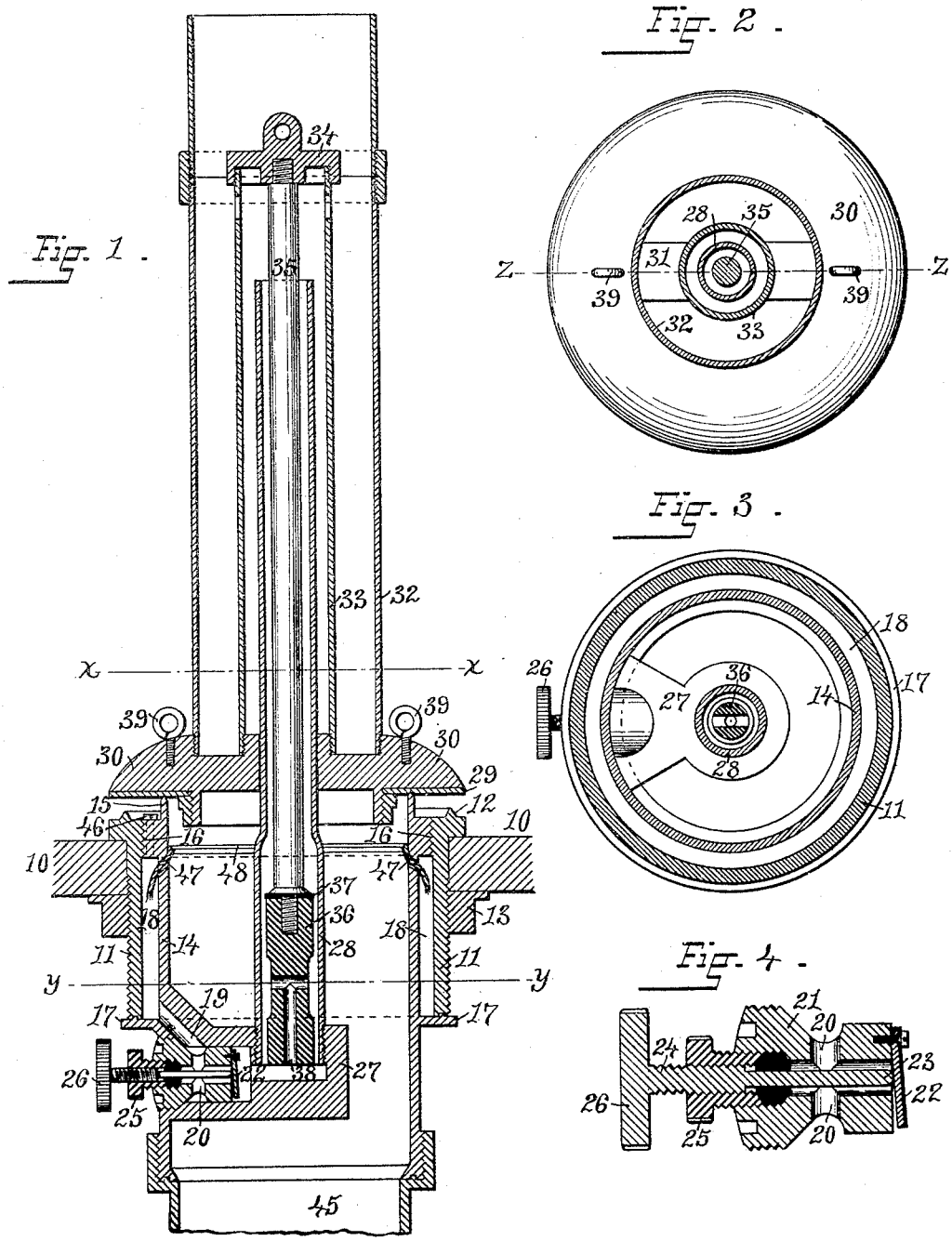

(No Model.) 2 Sheets—Sheet 2.

P. W. MEEHAN.
FLUSHING VALVE.

No. 437,864. Patented Oct. 7, 1890.

WITNESSES:
Chas. H. Luther Jr
U. F. Bligh.

INVENTOR:
Patrick W. Meehan
by Joseph A. Miller & Co.
Attys

UNITED STATES PATENT OFFICE.

PATRICK W. MEEHAN, OF PROVIDENCE, RHODE ISLAND.

FLUSHING-VALVE.

SPECIFICATION forming part of Letters Patent No. 437,864, dated October 7, 1890.

Application filed March 18, 1890. Serial No. 344,364. (No model.)

*To all whom it may concern:*

Be it known that I, PATRICK W. MEEHAN, of Providence, in the county of Providence and State of Rhode Island, have invented a new and useful Improvement in Flushing-Valves; and I hereby declare that the following is a full, clear, and exact description of the same, reference being had to the accompanying drawings, forming part of this specification.

This invention has reference to an improvement in the construction of flushing-valves for water-closets; and it consists in the peculiar combination and arrangement of the regulating devices by which the descent of the valve is controlled, as will be more fully set forth hereinafter.

Figure 1 is a vertical cross-section of my improved flushing-valve on the line Z Z, Fig. 2. Fig. 2 is a horizontal sectional view of the valve on the line X X, Fig. 1. Fig. 3 is a horizontal sectional view on the line Y Y, Fig. 1. Fig. 4 is a sectional view of the regulating-valve, and Fig. 5 is a sectional view of part of a flushing-tank provided with my improved flushing-valve and the operating-lever.

In the drawings, 10 indicates the bottom of the flushing-tank, and 11 a metal bushing having on the upper end the projecting flange 12. The lower portion of the bushing 11 is screw-threaded and is provided with the nut 13. The bushing is inserted into a hole made in the bottom 10, the flange 12 resting on the bottom, and the nut 13 is screwed against the bottom, so as to secure the bushing and make a water-tight joint.

The cylindrical valve-casing 14 is provided below the annular valve-seat 15 with the screw-threaded flange 16, which screws into a screw-thread formed on the inner surface of the bushing 11, and is also provided with the projecting flange 17, the upper surface of which is provided with a packing-ring or other suitable means to secure a tight joint between the flange 17 and the lower edge of the bushing 11 when the valve-casing 14 is screwed tightly into the bushing. Between the valve-casing 14 and the bushing 11 the annular chamber 18 is formed, and this chamber communicates, by means of the duct 19, with the passages 20 in the plug 21 of the regulating-valve, the outlet of which is closed by the check-valve 22. The opening of this outlet is regulated by the stem 23, the enlarged portion 24 of which is screw-threaded in the stuffing-box 25, and provided with the milled head 26. By turning the head 26 to the right the stem 23 pushes the check-valve 22 outward to increase the opening. By turning the said head and stem to the left the opening is reduced. The duct 19 and the regulating-valve are located in the inwardly-projecting arm 27 and connect with the upwardly-projecting tube 28, the upper portion of which is of smaller diameter than the lower.

29 indicates the weighted valve-disk consisting of the annular ring 30 and the bridge-piece 31. The overflow-tube 32 is secured to the annular ring 30, and the tube 33 is secured to a boss on the bridge-piece 31. The cap 34 is secured to the upper end of the tube 33, and to the cap 34 the plunger-rod 35. To the lower end of the plunger-rod 35 the piston 36 is secured, the yielding rubber or leather packing-disk 37 being placed between the end of the plunger-rod 35 and the piston 36. In the piston 36 the hole 38 extends from the lower end upward and connects with lateral openings. The packing-disk 37 closely fits the upper part of the tube 28.

To the weighted valve-disk the eyebolts 39 are secured. The rods 40 connect the valve with the lever 41, in the end 42 of which the rolls 43 form the bearings for the rods 40, which may be formed in a loop extending through the holes in the rolls 43. The chain 44 extends down to the water-closet and is used to operate the flushing-valve.

The operation of this improved valve is as follows: When the bushing has been secured in the bottom of the flushing-tank, the valve-casing into the bushing, the valve connected with the operating-lever, and the connections with the water-closet have been made by the pipe 45, connecting the valve with the duct, the plug 46, extending through the screw-threaded flange 16, is removed and the annular space 18 is filled with water, the valve is placed on its seat, and the flushing-tank is filled to the height at which the ball-valve will shut off the water. When, now, the chain 44 is pulled down, the end 42 of the lever 41 raises the valve from its seat, and with the valve raises the overflow-tube 32, the tube 33, the plunger-rod 35, and the piston 36. As soon as the packing-disk 37 enters the contracted portion of the tube 28 it acts as a suction-pump, the valve 22 acting as a foot-valve. The liquid in the annular space 18 is drawn through the ducts and passages and through the check-valve 22 into the tube 28, following the piston. When the valve is in this raised position, the water from the flushing-tank flows over the edges of the valve-seat 15 into the interior of the valve-casing 14 and down through the pipe 45 to the water-closet to flush the same. As soon as the chain is released the valve commences to descend. This descent is resisted by the liquid in the tube 28. If the packing-disk 37 tightly fits the contracted portion of the tube and the check-valve 22 is permitted to close, then the weighted main valve, with the overflow-tube, the plunger-rod, and piston, would be all supported on the liquid confined between the check-valve 22 and the packing-ring in the lower part of the tube 28, and the flushing-valve would remain open. By turning the head 26 of the stem 23 to project the stem against the check-valve 22, so as to keep the same from closing tight, the liquid is allowed to flow back from the tube 28 through the passages 19 and 20 into the annular space 18, and thus permits the piston 36, the plunger-rod 35, and with the same the flushing-valve and overflow-pipe to descend, and reseat the flushing-valve on the valve-seat 15, and by holding the check-valve 22 open more or less with the stem 23 this descent of the flushing-valve and the time allowed for closing the same can be regulated accurately to the exact amount of water required for flushing the closet. Instead of connecting the end 42 of the lever 41 with the eyebolts 39, the lever may be connected with the eye on the cap 34. In the closed condition of this flushing-valve the liquid in the annular space 18 and the liquid in the lower and enlarged end of the tube 28 will be at the same level. As some of this liquid will waste away by evaporation or otherwise, I have arranged to supply such waste, and to this end I form the groove 48 on the inner surface of the valve-casing 14 and drill two or more holes through the walls of the valve-casing, into which I insert the wicks 47, by which a small quantity of liquid caught in the groove at each discharge is conveyed into the annular space by capillary attraction when any liquid is wasted away from any cause. When the flushing-valve is raised, it will move freely upward until the packing-disk 37 enters the contracted portion of the tube 28, when the friction between the packing-disk and the tube retards the upward motion of the valve. When the valve descends, the pressure on the liquid forces the same through the axial duct 38 and sidewise against the inner surface of the tube through the lateral discharge-ducts, thereby lubricating the inner surface of the tube, allowing the valve to descend slowly until the packing-disk leaves the contracted portion of the tube 28, when the liquid, by passing around the piston 36, permits the sudden closing of the flushing-valve, thus securing a close contact of the valve with the valve-seat.

Having described my invention, I claim as new and desire to secure by Letters Patent—

1. In a flushing-valve, the combination, with the bushing 11 and the valve-casing 14, secured to and within the bushing, of the annular space 18, the duct 19, the check-valve 22, the tube 28, connected with the annular space, the weighted valve 29, the tube 33, secured to the valve 29, the cap 34, and the plunger 35, secured to the cap and by the tube 33 to the valve 29, constructed to control the descent of the valve by forcing the liquid from the central tube into the reservoir, as described.

2. In a flushing-valve, the combination, with the bottom of a flushing-tank, the bushing 11, and valve-casing 14, having the annular space 18 and central vertical tube 28, connected with the annular space by ducts, of the valve 22 and screw-threaded stem for regulating the same, the weighted flushing-valve provided with the tube 33, secured to the valve and inclosing the tube 28, the cap 34, and the plunger-rod 35, provided at its lower end with a piston constructed to regulate the closing of the valve, as described.

3. In a combined flushing and overflow valve, the combination, with a valve-casing having a central tube extending through the valve, and a reservoir connected with the interior of the central tube by ducts and passages, of a valve constructed to regulate the flow of liquid between the reservoir and the central tube, a weighted annular valve provided with an overflow-tube and with a tube inclosing the central tube, and a plunger-rod provided with a piston forming a tight sliding fit in the central tube, the upper end of which piston is secured to the annular valve by means of the concentric tube and moves with the same, constructed to control the descent of the flushing-valve and overflow-tube, as described.

4. The combination, with a flushing-tank and the lever 41, provided with the chain 44, and connections with the weighted annular valve 29, provided with the tubes 32 and 33, the cap 34, secured to the tube 33, the plunger 35, having at its lower end piston 36 and packing-disk 37, of the bushing 11, the valve-casing 14, secured to and within the bushing, the annular space 18, the valve 22 in the duct 19, regulating-stem 23, and the central tube 28, constructed to raise the flushing-valve and control its descent, as described.

PATRICK W. MEEHAN.

Witnesses:
M. F. BLIGH,
J. A. MILLER, JR.